United States Patent [19]

Weaver et al.

[11] 3,869,442

[45] Mar. 4, 1975

[54] PHENYL-AZO-N-ACYLAMIDOETHYLANILINE COMPOUNDS

[75] Inventors: Max A. Weaver; Clarence A. Coates, Jr., both of Kingsport, Tenn.

[73] Assignee: Eastman Kodak Company, Rochester, N.Y.

[22] Filed: Oct. 29, 1971

[21] Appl. No.: 194,047

[52] U.S. Cl............... 260/207.1, 8/41 B, 260/187, 260/346.1 R, 260/465 E, 260/557 R, 260/561 R, 260/562 R, 260/570.5 P
[51] Int. Cl.... C09b 29/08, C09b 31/04, D06p 3/24
[58] Field of Search ........ 260/207.1, 207, 152, 187, 260/205, 158

[56] References Cited
UNITED STATES PATENTS

| | | | |
|---|---|---|---|
| 2,238,486 | 4/1941 | Dickey et al. | 260/207.1 |
| 2,346,013 | 4/1944 | Dickey | 260/207.1 |
| 2,397,927 | 4/1946 | Dickey et al. | 260/199 |
| 3,206,454 | 9/1965 | Merian et al. | 260/205 |
| 3,314,935 | 4/1967 | Booth et al. | 260/206 |
| 3,359,256 | 12/1967 | Mueller et al. | 260/205 |
| 3,379,716 | 4/1968 | Wallace et al. | 260/207.1 |
| 3,393,191 | 7/1968 | Mueller | 260/205 |
| 3,510,470 | 5/1970 | Dickey et al. | 260/207.1 |
| 3,535,306 | 10/1970 | Altermatt et al. | 260/207.1 |
| 3,546,204 | 12/1970 | Weaver et al. | 260/205 |
| 3,547,571 | 12/1970 | Angliker | 260/207.1 X |
| 3,574,183 | 4/1971 | Kruckenberg | 260/207.1 |

FOREIGN PATENTS OR APPLICATIONS

| | | | |
|---|---|---|---|
| 734,846 | 4/1943 | Germany | 260/207.1 |
| 963,457 | 5/1957 | Germany | 260/207.1 |
| 754,146 | 3/1967 | Canada | 260/158 |

OTHER PUBLICATIONS
Altermatt et al., Chemical Abstracts, Vol. 73, p. 68, Article 89144c, (1970).

*Primary Examiner*—Floyd D. Higel

[57] ABSTRACT

Mono- and dis-azo compounds particularly useful for dyeing polyamide textile materials in deep yellow to red crock-fast shades with excellent fastness to light and brightness and improved buildup and contain a phenyl or phenylazophenyl diazo component and an aniline coupling component, the nitrogen atom of which is substituted with an acylamidoethyl group camera ready copy.

8 Claims, No Drawings

PHENYL-AZO-N-ACYLAMIDOETHYLANILINE COMPOUNDS

This invention concerns certain novel azo compounds useful as dyes for synthetic textile materials such as polyamide, cellulose acetate and polyester fibers, yarns and fabrics. This invention also concerns polyamide textile materials dyed with our novel azo compounds.

The azo compounds of our invention have the general formula

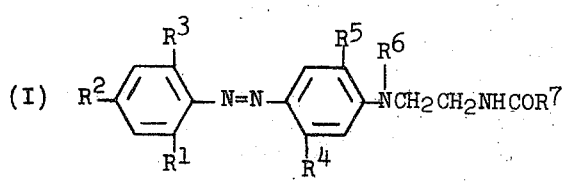

wherein
$R^1$ is hydrogen, halogen, cyano or the group $-SO_2R^8$ in which $R^8$ is one of the alkyl, aryl or cyclohexyl groups which $R^7$ can represent;
$R^2$ is $-COR^7$, cyano, carbamoyl, lower alkylcarbamoyl, formyl, arylazo, or $-SO_2R^8$;
$R^3$ is hydrogen or halogen;
$R^4$ is hydrogen, lower alkyl or the group $-NHCOR^7$;
$R^5$ is hydrogen or lower alkyl;
$R^6$ is hydrogen, alkyl of up to about eight carbon atoms, or cyclohexylmethyl; and
$R^7$ is lower alkyl; lower alkyl substituted with halogen, hydroxy, lower alkoxy, cyano, carbamoyl, lower alkanoyloxy or cyclohexyl; lower alkoxy; lower haloalkoxy; cyclohexyl; aryl; 2-furyl; or morpholino;
in which each aryl group is phenyl or phenyl substituted with lower alkyl, lower alkoxy or halogen.

Our novel compounds exhibit excellent fastness to light, brightness and dyeability on polyamide fibers and, accordingly, are especially useful for dyeing such fibers, particularly polyamide carpet fibers. The improved dyeabilitiy of our novel compounds is manifested by the deep yellow to red, crock-fast shades they produce on polyamide fibers. Our compounds also exhibit improved build-up which is another aspect of a dye compound's dyeability properties. These improved properties distinguish our novel compounds from the compounds disclosed in Canadian Pat. No. 754,146. Those prior art compounds, which are designed for dyeing non-nitrogenous fibers such as cellulose acetate and polyester fibers, exhibit poor properties on polyamide fibers when compared to our novel azo compounds.

The substituents represented by each of $R^1$ through $R^8$ are well known to those skilled in the art. As used herein to describe an alkyl moiety, "lower" designates a carbon content of one to about four carbon atoms. Chlorine and bromine are preferred halogen atoms. It is also preferred that only one of $R^5$ and $R^6$ is an alkyl group.

A group of our novel compounds which, because of their cost:performance ratio, are especially preferred are those in which $R^1$ is hydrogen, chlorine, bromine, cyano or lower alkylsulfonyl; $R^2$ is lower alkylsulfonyl, cyano or lower alkoxycarbonyl; $R^3$ is hydrogen, chlorine or bromine; $R^4$ is hydrogen, methyl or lower alkanoylamino, especially, acetamido; $R^5$ is hydrogen; $R^6$ is lower alkyl; and $R^7$ is lower alkyl or lower alkoxy.

Our novel compounds are prepared by diazotizing an amine having the formula

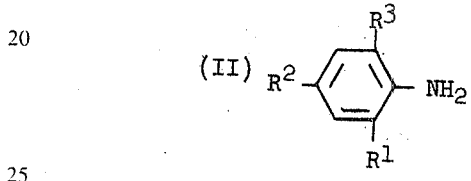

and coupling the resulting diazonium salt with a coupler of the formula

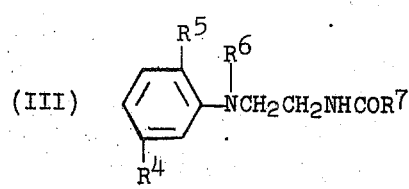

according to known procedures. Alternatively, azo compounds in which $R^3$ is cyano can be prepared by the cyanide displacement reaction in which the corresponding chloro- or bromo-substituted azo compound is treated with a cyanide salt in the presence of a copper catalyst according to published techniques. The amines having formula (II) are known compounds and/or can be prepared by known techniques.

The couplers of formula (III) are prepared by the following reaction sequence:

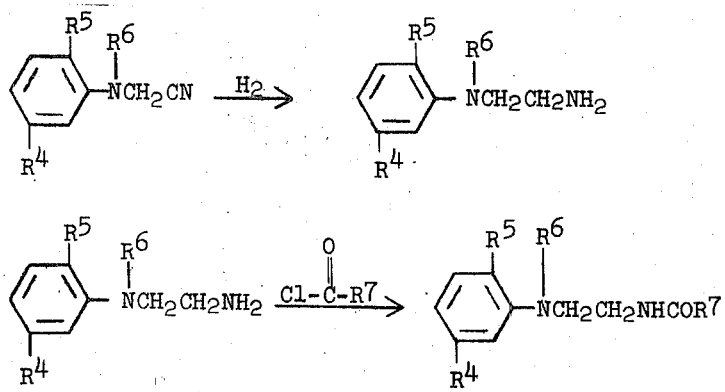

In some cases other acylating agents, such as anhydrides, may be substituted for the acylating agent having the formula $Cl-CO-R^7$. The couplers of formula (III) in which $R^5$ is hydrogen and $R^6$ is ethyl set forth in Table I are prepared according to the above-described technique.

Table I

| R⁴ | R⁷ | Acylating Agent | Melting Point, °C. |
|---|---|---|---|
| —CH₃ | —CH₃ | (CH₃CO)₂O | 111–112 |
| —CH₃ | —C₂H₅ | (C₂H₅CO)₂O | 67–68.5 |
| —CH₃ | —CH(CH₃)₂ | ([CH₃]₂CHCO)₂O | 61–62 |
| —CH₃ | —CH₂Cl | (ClCH₂CO)₂O | 92–94.5 |
| —CH₃ | —OC₂H₅ | C₂H₅OOC—Cl | 42–43 |
| —CH₃ | —OCH₂CH₂Cl | ClCH₂CH₂OOC—Cl | 72–74 |
| —CH₃ | —C₆H₁₁ | C₆H₁₁CO—Cl | 76–77 |
| —CH₃ | —C₆H₅ | (C₆H₅CO)₂O | 75–76.5 |
| —CH₃ | CH=CHCH=CHO | Cl—CO—CH=CHCH=CHO | 80–82 |
| —NHCOCH₃ | —C₆H₅ | C₆H₅CO—Cl | 98–100 |
| —NHCOCH₃ | CH=CHCH=CHO | Cl—CO—CH=CHCH=CHO | 149–150 |
| —NHCOCH₃ | —C₆H₁₁ | C₆H₁₁CO—Cl | 89–91 |
| —NHCOCH₃ | —CH₂C₆H₅ | C₆H₅CH₂CO—Cl | 153–155 |
| —NHCOCH₃ | —C₆H₄—p—OCH₃ | p—CH₃O—C₆H₄CO—Cl | 174–176 |
| —NHCOCH₃ | —CH₂OC₆H₅ | C₆H₅OCH₂CO—Cl | 103–106 |
| —NHCOCH₃ | —OC₂H₅ | C₂H₅OOC—Cl | 120–122 |

The azo compounds set forth in the following examples further illustrate the compounds of the invention.

EXAMPLE 1

Sodium nitrite (0.72 g.) is added portionwise to 5 ml. of conc. H₂SO₄. The solution is cooled and 10 ml. of 1:5 acid is added below 15°C. 2-Chloro-4-methylsulfonylaniline (2.05 g.) is added, followed by 10 ml. of 1:5 acid, all below 5°C. The diazotization reaction is stirred at 0°–5°C. for 2 hours and added to a chilled solution of 2.20 g. of N-(2-acetamidoethyl)-N-ethyl-m-toluidine in 40 ml. of 1:5 acid. Ammonium acetate is added to buffer the coupling mixture. After allowing to stand for 1 hour, the reaction mixture is drowned into water. The azo product is collected by filtration, washed with water, and dried in air. The azo compound obtained produces scarlet shades on polyamide fibers, has excellent fastness properties, and has the formula

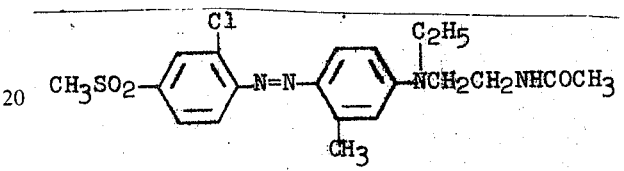

The azo compounds set forth in the examples of Table II correspond to formula (I) and are prepared by the procedures described hereinabove. The color given for each of the compounds refers to the shade it produces on polyamide fibers.

Table II

| Example No. | R¹ | R² | R³ | R⁴ | R⁵ | R⁶ | R⁷ | Color |
|---|---|---|---|---|---|---|---|---|
| 2 | —Cl | CH₃SO₂— | H | —CH₃ | H | —C₂H₅ | —C₂H₅ | Scarlet |
| 3 | —Cl | CH₃SO₂— | H | —CH₃ | H | —C₂H₅ | —CH(CH₃)₂ | Scarlet |
| 4 | —Cl | CH₃SO₂— | H | —CH₃ | H | —C₂H₅ | —CH=CHCH=CHO | Scarlet |
| 5 | —Cl | CH₃SO₂— | H | —CH₃ | H | —C₂H₅ | —OC₂H₅ | Scarlet |
| 6 | —Cl | CH₃SO₂— | H | —CH₃ | H | —C₂H₅ | —CH₂Cl | Scarlet |
| 7 | —Cl | CH₃SO₂— | H | —CH₃ | H | —C₂H₅ | —OCH₂CH₂Cl | Scarlet |
| 8 | —Cl | CH₃SO₂— | H | —CH₃ | H | —C₂H₅ | —CH₂OC₆H₅ | Scarlet |
| 9 | —Cl | CH₃SO₂— | H | —CH₃ | H | —C₂H₅ | —CH₂C₆H₅ | Scarlet |
| 10 | —Cl | CH₃SO₂— | H | —CH₃ | H | —C₂H₅ | —C₆H₅ | Scarlet |
| 11 | —Cl | CH₃SO₂— | H | —CH₃ | H | —C₂H₅ | —C₆H₁₁ | Scarlet |
| 12 | —Cl | CH₃SO₂— | —Cl | —CH₃ | H | —C₂H₅ | —CH₃ | Yellow-Brown |
| 13 | —Cl | CH₃SO₂— | —Br | —CH₃ | H | —C₂H₅ | —CH₃ | Yellow-Brown |
| 14 | —Br | CH₃SO₂— | —Br | H | H | —C₂H₅ | —CH₃ | Yellow-Brown |
| 15 | —Cl | CH₃SO₂— | H | H | H | —C₂H₅ | —CH₃ | Orange |
| 16 | —Cl | CH₃SO₂— | H | H | —CH₃ | H | —CH₃ | Orange |
| 17 | —Cl | CH₃SO₂— | H | —CH₃ | —CH₃ | H | —CH₃ | Scarlet |
| 18 | —Cl | CH₃SO₂— | H | —NHCOCH₃ | —CH₃ | H | —CH₃ | Scarlet |
| 19 | —Cl | CH₃SO₂— | H | —NHCOCH₃ | H | —C₂H₅ | —CH₃ | Scarlet |
| 20 | —SO₂CH₃ | CH₃SO₂— | H | —CH₃ | H | —C₂H₅ | —CH₃ | Red |
| 21 | —CN | CH₃SO₂— | H | —CH₃ | H | —C₂H₅ | —CH₃ | Red |
| 22 | —SO₂(CH₂)₃CH₃ | CH₃SO₂— | H | —CH₃ | H | —C₂H₅ | —CH₃ | Red |
| 23 | —Cl | CH₃SO₂— | H | —CH₃ | H | —(CH₂)₂CH₃ | —CH₃ | Scarlet |
| 24 | —Cl | CH₃SO₂— | H | —CH₃ | H | —CH₂CH(CH₃)₂ | —CH₃ | Scarlet |
| 25 | —Cl | CH₃SO₂— | H | —CH₃ | H | —CH₂C₆H₁₁ | —CH₃ | Scarlet |
| 26 | —Cl | CH₃SO₂— | H | —CH₃ | H | —CH(CH₃)C₂H₅ | —CH₃ | Scarlet |
| 27 | —Cl | CH₃SO₂— | H | —CH₃ | H | —C₂H₅ | —CH₂CH₂OH | Scarlet |
| 28 | —Cl | CH₃SO₂— | H | —CH₃ | H | —C₂H₅ | —(CH₂)₃OH | Scarlet |
| 29 | —Cl | CH₃SO₂— | H | —CH₃ | H | —C₂H₅ | —CH₂CN | Scarlet |
| 30 | —Cl | CH₃SO₂— | H | —CH₃ | H | —CH(C₂H₅)(CH₂)₄CH₃ | —CH₂CONH₂ | Scarlet |
| 31 | —Cl | CH₃SO₂— | H | —CH₃ | H | —C₂H₅ | —CH₂OH | Scarlet |
| 32 | —Cl | CH₃SO₂— | H | —CH₃ | H | —C₂H₅ | —CH₂C-H₂OOCCH₃ | Scarlet |
| 33 | H | —CN | H | —CH₃ | H | —C₂H₅ | —CH₃ | Orange |
| 34 | —Cl | —CN | H | —CH₃ | H | —C₂H₅ | —CH₃ | Red |

Table II —Continued

| Example No. | R¹ | R² | R³ | R⁴ | R⁵ | R⁶ | R⁷ | Color |
|---|---|---|---|---|---|---|---|---|
| 35 | —Cl | —CN | H | —CH₃ | H | —C₂H₅ | —C₂H₅ | Red |
| 36 | —Cl | —CN | —Br | —CH₃ | H | —C₂H₅ | —CH₃ | Red-Brown |
| 37 | —Br | —CN | —Br | —CH₃ | H | —C₂H₅ | —CH₃ | Red-Brown |
| 38 | —Br | —CN | H | —CH₃ | H | —C₂H₅ | —CH₃ | Red |
| 39 | —CN | —CN | H | —CH₃ | H | —C₂H₅ | —CH₃ | Red |
| 40 | —SO₂CH₃ | —CN | H | —CH₃ | H | —C₂H₅ | —CH₃ | Red |
| 41 | —Br | —CN | H | —NH-COCH₃ | H | —C₂H₅ | —CH₃ | Red |
| 42 | —Br | —CN | H | —NH-COCH₃ | —CH₃ | H | —CH₃ | Red |
| 43 | —Br | —COOC₂H₅ | H | —CH₃ | H | —C₂H₅ | —CH₃ | Orange |
| 44 | —Br | —COOC₂H₅ | —Br | —CH₃ | H | —C₂H₅ | —CH₃ | Red-Brown |
| 45 | —Br | —COOCH₃ | H | —CH₃ | H | —C₂H₅ | —CH₃ | Orange |
| 46 | —Br | —COOCH₂CH₂OCH₃ | H | —CH₃ | H | —C₂H₅ | —CH₃ | Orange |
| 47 | —CN | —COOC₂H₅ | H | —CH₃ | H | —C₂H₅ | —CH₃ | Red |
| 48 | —Br | —COCH₃ | H | —CH₃ | H | —C₂H₅ | —CH₃ | Orange |
| 49 | —Br | —COC₆H₅ | H | —CH₃ | H | —C₂H₅ | —CH₃ | Orange |
| 50 | —Br | —CONCH₂C-H₂OCH₂CH₂ | H | —CH₃ | H | —C₂H₅ | —C₂H₅ | Orange |
| 51 | —Br | —CONHC₂H₅ | H | —CH₃ | H | —C₂H₅ | —CH₃ | Orange |
| 52 | —CN | —CONHC₂H₅ | H | —CH₃ | H | —C₂H₅ | —CH₃ | Red |
| 53 | —Br | —CHO | H | —CH₃ | H | —C₂H₅ | —CH₃ | Orange |
| 54 | —Br | —CHO | H | —CH₃ | —Br | —C₂H₅ | —CH₃ | Yellow-Brown |
| 55 | H | C₆H₅—N=N— | H | —CH₃ | H | —C₂H₅ | —CH₃ | Scarlet |
| 56 | H | 2—Cl—C₆H₄—N=N— | H | —CH₃ | H | —C₂H₅ | —CH₃ | Scarlet |
| 57 | —Br | C₆H₅—N=N— | H | —CH₃ | H | —C₂H₅ | —CH₃ | Red |
| 58 | —CN | —COCH₃ | H | —CH₃ | H | —C₂H₅ | —CH₃ | Red |
| 59 | H | —SO₂C₂H₅ | H | —CH₃ | H | —C₂H₅ | —CH₃ | Orange |
| 60 | —Br | —SO₂CH₂CH₂OH | H | —CH₃ | H | —C₂H₅ | —CH₃ | Scarlet |
| 61 | —Br | —SO₂CH₂CH₂CN | H | —CH₃ | H | —C₂H₅ | —CH₃ | Scarlet |
| 62 | —Br | —SO₂CH₂CH₂CONH₂ | H | —CH₃ | H | —C₂H₅ | —CH₃ | Scarlet |
| 63 | —Br | —SO₂CH₂C₆H₁₁ | H | —CH₃ | H | —C₂H₅ | —CH₃ | Scarlet |

The novel azo compounds can be applied to polyamide textile materials according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

EXAMPLE 64

The azo compound (50.0 mg.) of Example 1 is dispersed in 5 cc. of 2-methoxyethanol. A small amount (3-5 cc.) of a 3% sodium lignin sulfonate solution is added, with stirring, and then the volume of the bath is brought to 150 cc. with water. A 5 g. textile fabric made of nylon 66 fibers is placed in the bath which is then slowly brought to the boil. The dyeing is carried out at the boil for one hour with occasional stirring. The dyed fabric is then removed from the dyebath, rinsed with water, and dried in an oven at 250°F. The fabric is dyed a bright scarlet shade exhibiting excellent fastness properties when tested in accordance with the procedures described in the Technical Manual of the American Association of Textile Chemists and Colorists, 1968 edition.

The polyamide materials which can be dyed with the novel azo compounds are well known and include nylon 66 (polyhexamethylene adipamide) manufactured by the polymerization of adipic acid and hexamethylenediamine, nylon 6 Polycaprolactam) prepared from epsilon-aminocaproic acid lactam (caprolactam), and nylon 8. A detailed description of the synthetic polyamide materials which are dyed bright, fast shades by the compounds of the invention is set forth in U.S. Pat. No. 3,100,134.

The invention has been described in detail with particular reference to preferred embodiments thereof, but it will be understood that variations and modifications can be effected within the spirit and scope of the invention.

We claim:

1. A compound having the formula

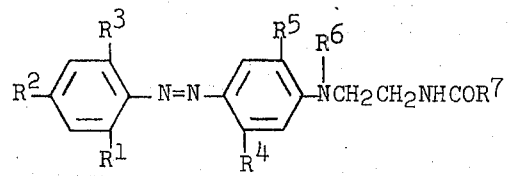

wherein
R¹ is hydrogen, chlorine, bromine, or lower alkylsulfonyl;
R² is phenylazo or lower alkylsulfonyl;
R³ is hydrogen, chlorine or bromine;
R⁴ is hydrogen, lower alkyl or the group —NHCOR⁷;
R⁵ is hydrogen or lower alkyl;
R⁶ is hydrogen, alkyl of up to about eight carbon atoms or cyclohexylmethyl; and
R⁷ is lower alkyl; lower alkyl substituted with chlorine, hydroxy, lower alkoxy, cyano, carbamoyl, lower alkanoyloxy or cyclohexyl; lower alkoxy; cyclohexyl; phenyl; phenyl substituted with lower alkyl, lower alkoxy or chlorine; or 2-furyl.

2. A compound according to claim 1 wherein
R¹ is hdyrogen, chlorine, bromine, cyano or lower alkylsulfonyl;
R² is lower alkylsulfonyl, cyano or lower alkoxycarbonyl;
R³ is hydrogen, chlorine or bromine;
R⁴ is hydrogen, methyl or lower alkanoylamino;
R⁵ is hydrogen;
R⁶ is lower alkyl; and
R⁷ is lower alkyl or lower alkoxy.

3. A compound according to claim 1 having the formula

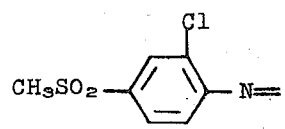
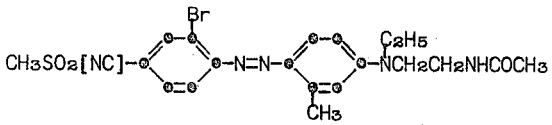
4. A compound according to claim 1 having the formula
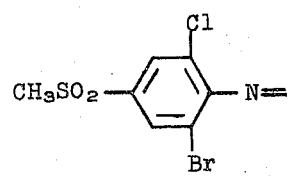
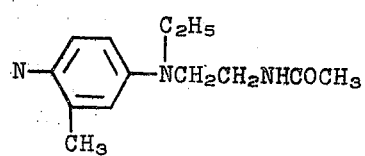
5. A compound according to claim 1 having the formula
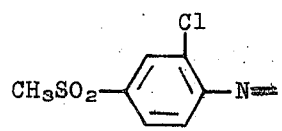
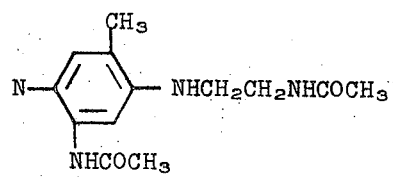
6. A compound according to claim 1 having the formula
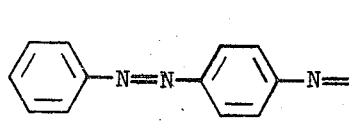
7. A compound according to claim 1 having the formula
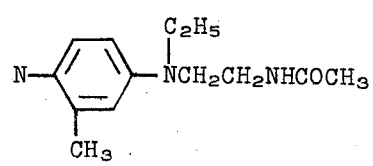
8. A compound according to claim 1 having the formula
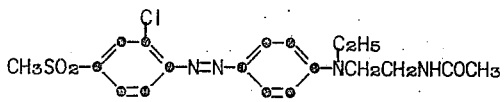
* * * * *

UNITED STATES PATENT OFFICE
CERTIFICATE OF CORRECTION

Patent No. 3,869,442                         Dated March 4, 1975

Inventor(s) Max A. Weaver, Clarence A. Coates, Jr.

It is certified that error appears in the above-identified patent and that said Letters Patent are hereby corrected as shown below:

Line 8 of the Abstract, delete "camera ready copy" and insert
---, exemplified by the compounds

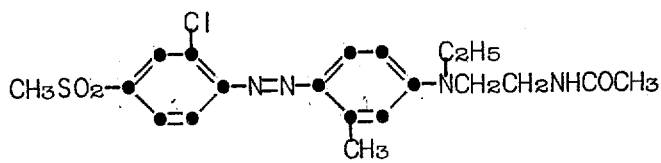

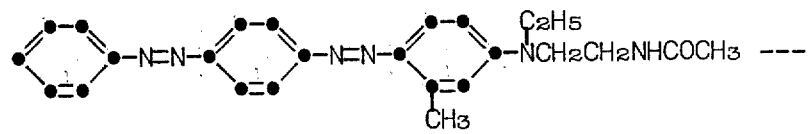

Column 8, line 5, the formula in Claim 6 should read

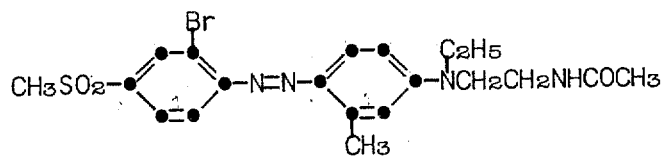

Signed and Sealed this twenty-fifth Day of November 1975

[SEAL]

Attest:

RUTH C. MASON
Attesting Officer

C. MARSHALL DANN
Commissioner of Patents and Trademarks